(12) United States Patent
Xavier et al.

(10) Patent No.: US 11,075,930 B1
(45) Date of Patent: Jul. 27, 2021

(54) SYSTEM AND METHOD FOR DETECTING REPETITIVE CYBERSECURITY ATTACKS CONSTITUTING AN EMAIL CAMPAIGN

(71) Applicant: FireEye, Inc., Milpitas, CA (US)

(72) Inventors: Jijo Xavier, Milpitas, CA (US); Robert Venal, Milpitas, CA (US)

(73) Assignee: FireEye, Inc., Milpitas, CA (US)

(\*) Notice: Subject to any disclaimer, the term of this patent is extended or adjusted under 35 U.S.C. 154(b) by 179 days.

(21) Appl. No.: 16/020,896

(22) Filed: Jun. 27, 2018

(51) Int. Cl.
*H04L 29/06* (2006.01)
*H04L 12/58* (2006.01)

(52) U.S. Cl.
CPC .......... *H04L 63/1425* (2013.01); *H04L 51/12* (2013.01); *H04L 63/20* (2013.01)

(58) Field of Classification Search
CPC ..... H04L 63/1425; H04L 51/12; H04L 63/20; H04L 63/1408; H04L 63/1416; H04L 2463/144; H04L 63/1441; H04L 63/145
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.-mining.pdf-.

(Continued)

*Primary Examiner* — Oleg Korsak
*Assistant Examiner* — Feliciano S Mejia
(74) *Attorney, Agent, or Firm* — Rutan & Tucker, LLP

(57) ABSTRACT

According to one embodiment, a system for detecting an email campaign includes feature extraction logic, pre-processing logic, campaign analysis logic and a reporting engine. The feature extraction logic obtains features from each of a plurality of malicious email messages received for analysis while the pre-processing logic generates a plurality of email representations that are arranged in an ordered sequence and correspond to the plurality of malicious email message. The campaign analysis logic determines the presence of an email campaign in response to a prescribed number of successive email representations being correlated to each other, where the results of the email campaign detection are provided to a security administrator via the reporting engine.

22 Claims, 7 Drawing Sheets

(56) References Cited

U.S. PATENT DOCUMENTS

| | | | |
|---|---|---|---|
| 6,092,194 A | 7/2000 | Touboul | |
| 6,094,677 A | 7/2000 | Capek et al. | |
| 6,108,799 A | 8/2000 | Boulay et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sorhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry et al. | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,089,241 B1 * | 8/2006 | Alspector | G06Q 10/107 |
| 7,093,002 B2 | 8/2006 | Wolff et al. | |
| 7,093,239 B1 * | 8/2006 | van der Made | G06F 21/562 |
| | | | 714/38.13 |
| 7,096,498 B2 | 8/2006 | Judge | |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,213,260 B2 | 5/2007 | Judge | |
| 7,225,466 B2 * | 5/2007 | Judge | G06F 21/554 |
| | | | 726/22 |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 * | 7/2007 | Kasper | G06F 21/55 |
| | | | 713/188 |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 | 7/2009 | Szor et al. | |
| 7,584,455 B2 | 9/2009 | Ball | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,716,297 B1 * | 5/2010 | Wittel | H04L 51/12 |
| | | | 709/206 |
| 7,730,011 B1 | 6/2010 | Deninger et al. | |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,387 B2 | 5/2011 | Frazier et al. | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,464,340 B2 | 6/2013 | Ahn et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |

(56) References Cited

U.S. PATENT DOCUMENTS

| | | |
|---|---|---|
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,667,069 B1 * | 3/2014 | Connelly ............... H04L 51/32 709/206 |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,903,920 B1 * | 12/2014 | Hodgson ............... G06F 21/562 709/206 |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,338,026 B2 * | 5/2016 | Bandini ............... H04L 51/12 |
| 9,344,447 B2 * | 5/2016 | Cohen ............... G06F 16/285 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,596,264 B2 * | 3/2017 | Sandke ............... H04L 63/1425 |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,686,308 B1 * | 6/2017 | Srivastava ............... G06Q 10/107 |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,876,753 B1 * | 1/2018 | Hawthorn ............... H04L 51/18 |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael |
| 9,912,684 B1 | 3/2018 | Aziz et al. |

(56) References Cited

U.S. PATENT DOCUMENTS

| | | |
|---|---|---|
| 9,912,691 B2 | 3/2018 | Mesdaq et al. |
| 9,912,694 B2* | 3/2018 | Hagar ................. H04L 63/1441 |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael |
| 9,954,880 B2* | 4/2018 | Mason ..................... G06F 40/14 |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,313,378 B2* | 6/2019 | Makavy .............. H04L 63/1425 |
| 10,425,444 B2* | 9/2019 | Elworthy ............ H04L 63/1408 |
| 10,657,182 B2* | 5/2020 | Barber ..................... G06F 7/02 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van De Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |

(56) References Cited

U.S. PATENT DOCUMENTS

| | | |
|---|---|---|
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1* | 3/2008 | Tan ............... G06F 21/56 713/168 |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077182 A1* | 3/2009 | Banjara ............... H04L 51/34 709/206 |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |

(56) References Cited

U.S. PATENT DOCUMENTS

| | | |
|---|---|---|
| 2012/0023593 A1 | 1/2012 | Puder |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0325991 A1* | 12/2013 | Chambers ............... H04L 51/12 709/206 |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0082726 A1* | 3/2014 | Dreller ............... H04L 51/26 726/23 |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2019/0020687 A1* | 1/2019 | Noon ............... H04L 63/102 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System {NIFS) Whitepaper", ("NetDetector Whitepaper"), (2003).

"When Virtual is Better Than Real", IEEEXplore Digital Library, available at, http://ieeexplore.ieee.org/xpl/articleDetails.sp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

(56) References Cited

OTHER PUBLICATIONS

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), {Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

Venezia, Paul, "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

SYSTEM AND METHOD FOR DETECTING REPETITIVE CYBERSECURITY ATTACKS CONSTITUTING AN EMAIL CAMPAIGN

FIELD

Embodiments of the disclosure relate to the field of cybersecurity. More specifically, one embodiment of the disclosure relates to a cybersecurity system that detects repetitive cybersecurity attacks such as malicious electronic mail (email) campaigns.

GENERAL BACKGROUND

Cybersecurity attacks have become a pervasive problem for organizations as many networked devices and other resources have been subjected to attack and compromised. A cyber-attack constitutes a threat to security which may involve the infiltration of any type of content, such as software for example, onto a network device with the intent to perpetrate malicious or criminal activity or even a nation-state attack (e.g., "malware"). Besides infiltration of malware, a threat to security (hereinafter, "cybersecurity threat") may arise from a phishing attack, a forced loading of an unwanted application, or receipt of one or more malicious electronic mail (email) messages. A malicious email contains malware or otherwise is intended for malicious purposes, constituting or being part of a cyber-attack.

Recently, threat detection has undertaken many approaches involving network-based, cybersecurity threat protection services. One conventional approach involves placement of threat detection devices at the periphery of and throughout an enterprise network. This approach is adapted to (i) analyze information, such as email messages propagating over or being sent to a protected network device within the network, for example, to determine whether any of these email messages is suspicious and (ii) conduct a further analysis of at least the email messages deemed suspicious to determine whether any of the suspicious email messages constitute a cybersecurity attack. The result of the analyses is reported back to a network or enterprise administrator through one or more alert messages.

For many enterprises, given increasing numbers of detected cybersecurity threats identified in numerous alert messages, administrators are experiencing challenges in detecting large-scale cybersecurity attacks, especially detecting and identifying malicious email messages that are part of the same cybersecurity attack against the same target or many targets. The ability to detect the large-scale cybersecurity attack, referred to as an "email campaign," is important for helping customers efficiently triage malicious email messages. Furthermore, conventional reliance on visual analysis of the relatedness between temporally proximate email messages by a human analyst, in efforts to detect a campaign, is prone to inefficiencies, error and the inherent limitations of even the most expert of analysts.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
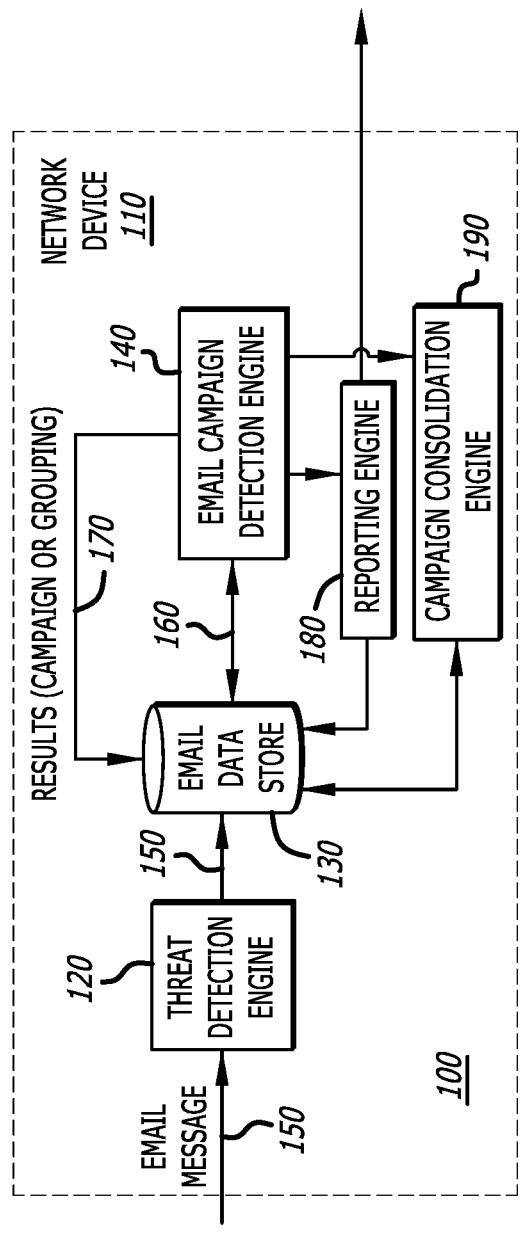
FIG. 1 is an exemplary block diagram of an exemplary embodiment of a cybersecurity system including an electronic mail (email) campaign detection engine.

Embodiments of the present disclosure generally relate to a cybersecurity system and method that automatically detects, without the need for human interaction, repetitive cybersecurity attacks such as malicious email campaigns for example. An email campaign is a targeted and deliberate cyberattack based on repetitious transmission of email messages, often sent from different sources, in an attempt to infiltrate or disrupt operations of a targeted network device and/or exfiltrate data therefrom, or gain access via that targeted network device into a network and/or other information technology infrastructure. The email campaign may be directed to a particular network device or a particular victim (e.g., person, group of persons, or company) and the email campaign may target a specific industry, geography, or even a particular computing environment (e.g., operating system, etc.) installed on network devices maintained by the particular victim.

I. Detailed Overview

An email campaign detection engine may be implemented within a cybersecurity system, operating in concert with a threat detection engine to detect a malicious email campaign. The email campaign detection engine is configured to enable customers to better triage incoming email messages that are classified by the threat detection engine as malicious. The threat detection engine may classify an email message as "malicious" or "benign. An email message is classified as "malicious" when the threat detection engine determines that the likelihood (e.g., probability, etc.) of the email message being associated with a cybersecurity attack exceeds a particular threshold.

According to one embodiment of the disclosure, each email message determined to be malicious may be temporarily stored, where a time-stamp is applied to each malicious email message and/or its corresponding email representation described below. Each of these malicious email messages is stored and, for purposes of email campaign determination, is part of a set (e.g., two or more) of malicious email messages (sometimes referred to as "the malicious email set") at least until the malicious email message has been determined to be part of an email campaign or a prescribed storage duration for the malicious email message has elapsed. Alternatively, the malicious email messages (and corresponding representations) may be stored and deleted in accordance with a first-in, first-out (FIFO) storage protocol when an email data store exceeds a capacity threshold.

According to one embodiment of the disclosure, the email campaign detection engine includes feature extraction logic, pre-processing logic, and campaign analytic logic. Herein, the feature extraction logic of the email campaign detection engine receives content associated with malicious email messages, which are intercepted and processed by the threat detection engine, and extracts a plurality of features from each of the malicious email messages under analysis. Each feature may include a character string (e.g., a combination of two or more letters, numbers, and/or symbols) extracted from a header of a malicious email message and/or a body of that malicious email message. As an illustrative example, the plurality of features may include (i) characters from a "Subject line" of the malicious email message, (ii) characters from the "From" address field, and/or (iii) characters associated with the name of an attachment to the malicious email message. Other features may be included with or substituted for the features listed above.

Thereafter, the email campaign detection engine performs pre-processing operations on the extracted features for each malicious email message to generate an email representation for that malicious email message. More specifically, the pre-processing logic includes (i) filtering logic and (ii) ordering logic. The filtering logic is configured to remove (or substitute) certain characters (e.g., special characters, spaces, etc.) from each character pattern that is formed from characters associated with the extracted features. The removed (or substituted) characters may have been added to obfuscate the actual message and/or its source. The ordering logic may be configured to (i) generate an email representation by either (a) performing no further operations on the filtered character patterns or (b) rearranging portions of the filtered character pattern to produce a restructured character pattern, and (ii) reorder the email representations associated with the malicious email messages. The reordering of the email representations may be conducted in order to group together email representations with common characteristics, such as reordering alphanumerically and/or reordering chronologically for example.

Afterwards, the campaign analytic logic of the email campaign detection engine is configured to determine whether each email representation is associated with an email campaign or not. First, the campaign analytic logic determines a level of correlation (e.g., a degree of similarity) between a first email representation of the ordered arrangement of email representations and any character patterns associated with known email campaigns. If the correlation between the first email representation and a particular character pattern associated with a known email campaign is equal to or exceeds a first threshold, the email message associated with the first email representation is identified as part of the known email campaign. The correlation may be based on a particular edit distance (e.g., Levenshtein distance), although other metrics may be used such as Overlap coefficient.

Upon failing to determine that the first email representation is part of a known email campaign, the campaign analytic logic determines the correlation between the first email representation and a neighboring (e.g., second) email representation in the ordered sequence of email representations. If the correlation between the first email representation and the second email representation is equal to or exceeds a second threshold, which may be the same or different from the first threshold, the email message associated with the first email representation is identified as being a potential "border" email message for an email campaign. The count logic, reset to a predetermined number (e.g., "0") upon commencing an email campaign analysis for the malicious email set, is incremented or decremented to produce a count value. The first and second email messages are "clustered" based on a detected correlation exceeding the second threshold. A cluster exceeding a prescribed number (N) of email messages (e.g., N≥10) represents a strong indicator of a malicious email campaign.

The above-described operations by the campaign analytic logic continue for each email representation of the ordered arrangement of email representations. In the event that the prescribed number (N) of email representations are not associated with any known campaigns, but each email representation is correlated with its neighboring email representation (i.e. each correlation exceeds the second threshold), the malicious email messages corresponding to the "N" email representations are classified as part of an email campaign. An ID assignment logic within the email campaign detection engine assigns a campaign identifier (ID) to each malicious email message identified as part of an email campaign, which is then represented by the assigned campaign ID. The above-described operations by the campaign analytic logic continue for each successive email representation of the ordered sequence of email representations until the correlation between that email representation under analysis and its neighboring email representation falls below the second threshold. This identifies the email message corresponding to the email representation under analysis as being the last email message within the email campaign.

Thereafter, an alert message may be issued to a security administrator initiated by the reporting engine of the cyber-security system as shown (or logic operating similar to the reporting engine being deployed the email campaign detection engine). In some embodiments, however, the email campaign detection engine may utilize a graphical user interface to identify malicious or benign labeled email messages as determined by the threat detection engine, and whether any of the labeled malicious email messages is associated with an email campaign. In some embodiments where an email campaign is identified that corresponds to a known email campaign, further stored information regarding the known email campaign can be obtained and provided to enrich the alert or report.

As described herein, the threat detection engine, communicatively coupled to the email campaign detection engine, may be configured to conduct a static analysis and/or a dynamic analysis on content of the email message and/or an attachment or embedded link (e.g., uniform resource locator "URL") in the email message to determine whether the email message is malicious or benign. The threat detection engine classifies an incoming email message is "malicious" in, response to determining the likelihood of maliciousness exceeds a particular threshold. When the email campaign detection engine later determines the same email message is part of an email campaign, and the security administrator receives the alert message, the security administrator can take remedial action with higher confidence that a serious cyber-attack is underway. The malicious email message are stored in the email data store for subsequent access by the email campaign detection engine, as further described herein.

II. Terminology

In the following description, certain terminology is used to describe aspects of the invention. In certain situations, each of the terms "logic," "system," "component," or "engine" is representative of hardware, firmware, and/or software that is configured to perform one or more functions. As hardware, the logic (or system/component/engine) may include circuitry having data processing or storage functionality Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or system/component/engine) may be software in the form of one or more software modules. The software modules may include an executable application, a daemon application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, a hard disk drive, an optical disc drive, or a portable memory device. As firmware, the executable code may be stored in persistent storage.

A "network device" generally refers to either a physical electronic device featuring data processing and/or network connection functionality or a virtual electronic device being software that virtualizes certain functionality of the physical network device. Examples of a network device may include, but are not limited or restricted to, a server, a mobile phone, a computer, a set-top box, a standalone cybersecurity appliance, a network adapter, a video game console, an intermediary communication device (e.g., router, firewall, etc.), a virtual machine, or any other virtualized resource.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMES SAGE; Instant Message Access Protocol (IMAP); or the like. Hence, each message may be in the form of one or more packets, frame, or any other series of bits having the prescribed, structured format.

The term "computerized" generally represents that any corresponding operations are conducted by hardware in combination with software and/or firmware. In certain instances, the terms "compare," "comparing," "comparison," or other tenses thereof generally mean determining if a match (e.g., identical or a prescribed level of correlation) is achieved.

The term "transmission medium" generally refers to a physical or logical communication link (or path) between two or more network devices. For instance, as a physical communication path, wired interconnects in the form of electrical wiring, optical fiber, cable, or bus trace may be used. For a wireless interconnect, wireless transmitter/receiver logic supporting infrared or radio frequency (RF) transmissions may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. Cybersecurity System

Referring to FIG. 1, an exemplary block diagram of a first embodiment of a cybersecurity system 100 is shown, where the cybersecurity system 100 is deployed within one or more network devices (e.g., network device 110). The cybersecurity system 100 is configured to analyze incoming electronic mail (email) messages and determine whether a set of email messages constitutes an email campaign cyberattack. For this embodiment of the disclosure, the cybersecurity system 100 includes a threat detection engine 120, an email data store 130, and an email campaign detection engine 140. The threat detection engine 120 classifies each incoming email message as "malicious" (e.g., likelihood of the email message being malicious exceeds a particular threshold) or "benign" (e.g., likelihood of the email message being malicious falls below the particular threshold). For this embodiment, a set of malicious email messages are maintained within the email data store 130 for subsequent analysis by the email campaign detection engine 140, which analyzes whether each malicious email message is part of a known email campaign or a subset of the malicious email messages constitute a new email campaign.

It is noted, however, that the email campaign detection engine 140 may be utilized to determine if further analysis for maliciousness is needed. In particular, for an email messages 150 classified as suspicious (or even inconclusive), e.g., by static analysis as described below, the determination of an email campaign may be used to identify those email messages for further analysis. For example, the determination of an email campaign for the suspicious (not malicious) email message 150 may prompt dynamic analysis or more in-depth forensic analysis of the email message 150. Also, such in-depth analysis may be conducted with respect to only representative email messages(s) of each cluster or sequence found to be part of an email campaign.

More specifically, the threat detection engine 120 receives the email message 150 from an external source (not shown), which may be copied or intercepted during transit over a network (e.g., enterprise network or a public network). The external source may include a network device remotely located from the network device 110 including the cybersecurity system 100. Alternatively, the external source may include a data capturing device. The data capturing device may be adapted as a "network tap" or a Switch Port Analyzer (SPAN) port (e.g., a mirror port), which is configured to intercept email messages being transmitted to a destination.

The threat detection engine 120 is configured to perform a static analysis on the content of the email message 150 and/or perform a dynamic analysis by supplying the email message 150 (or contents of the email message 150) to a virtual machine (or other isolated execution environment), performing operations on the email message 150 within the virtual machine, and analyzing behaviors of the email message 150 and/or the virtual machine to determine whether the email message 150 is malicious or benign. Examples of a "static" analysis may include, but are not limited or restricted to anti-virus scanning, anti-spam scanning, pattern matching, heuristics, and exploit or vulnerability signature matching. Examples of a run-time, "dynamic" analysis may include, but are not limited or restricted to opening and execution of the email message 150, and extraction, loading and execution of any attachment (e.g., document), with monitoring of the behaviors observed within an isolated execution environment such as a virtual machine equipped with an email application and operating system to replicate or mimic a typical email destination, or the like.

Upon determining that the email message 150 is malicious, the malicious email message 150 may be provided to the email data store 130. The email data store 130 is configured to store the contents of the malicious email message 150. The malicious email message 150 may be stored in accordance with a first-in, first-out (FIFO) storage protocol where the malicious email message 150 is removed from the email data store 130 when the email data store 130 exceeds a capacity threshold. Alternatively, according to one embodiment of the disclosure, each of the malicious email messages, including the malicious email message 150, may be time stamped and retained in the email data store 130 for a prescribed period of time from the timestamp (a prescribed number of hours, a prescribed number of days, etc.). Once the prescribed period of time has elapsed, the addressed storage location(s) for the malicious email message 150 is available to be overwritten.

Utilizing a push or pull email retrieval scheme, the email campaign detection engine 140 receives content for each malicious email message associated with a set of malicious email messages (sometimes referred to as "malicious email set") 160 stored within the email data store 130. The content may be from the email message 150 or a copy of the email message 150. The email campaign detection engine 140 extracts features from the received content, where each feature may be represented by a character string (e.g., one or more characters being letters, numbers, and/or symbols). The character strings may be aggregated to produce a character pattern. The character pattern is filtered to remove one or more characters (e.g., special characters, spaces, etc.) that may be used in an attempt to distinguish, and thereby obfuscate, the detected content from content/sources of prior malicious email messages.

As described below in greater detail, the email campaign detection engine 140 is configured to rearrange portions of the filtered character pattern to produce a restructured character pattern (hereinafter, "email representation"). Thereafter, the email campaign detection engine 140 rearranges the email representations, corresponding to the malicious email messages of the malicious email set 160, into an ordered sequence of email representations. For example, the email campaign detection engine 140 may rearrange the email representations currently maintained in a first ordered sequence into a second ordered sequence. The second ordered sequence may differ in ordering from the first ordered sequence.

After the email representations are rearranged into the second ordered sequence, the email campaign detection engine 140 analyzes each email representation in an iterative manner and in an order provided by the second ordered sequence. More specifically, for each email representation from the second ordered sequence, the email campaign detection engine 140 initially compares the email representation under analysis to character patterns associated with known email campaigns. If a prescribed level of correlation is not detected between that email representation and the character patterns associated with known email campaigns, where available, the email campaign detection engine 140 compares the email representation under analysis to its neighboring (next) email representation within the second ordered sequence. Hence, the email campaign detection engine 140 determines whether the email representation under analysis is correlated to the neighboring email representation. Based on such findings, the email representation may be a "border" (start/end) message of an email campaign, as described below in FIGS. 3A-3B. Otherwise, another iteration of the analysis is performed if email representations associated with email messages within the malicious email set 160 have not been analyzed.

Thereafter, for the next iteration, the neighboring email representation within the second ordered sequence becomes the email representation under analysis and the above-described analysis is repeated until all email representations corresponding to the malicious email messages of the malicious email set 160 have been evaluated. Upon detecting at least a predetermined number of malicious email representations being correlated, which correspond to a prescribed subset of malicious email messages within the malicious email set 160, the email campaign detection engine 140 generates and assigns a campaign ID to each malicious email message within the subset of malicious email messages as part of an identified email campaign.

According to one embodiment of the disclosure, the email campaign detection engine 140 returns results 170 of its analysis to the email data store 130. The results 170 may identify one or more of the set of malicious email messages 160 being part of a known email campaign or a subset of malicious email set 160 being part of a newly detected email campaign. Also, the email campaign detection engine 140 notifies reporting engine 180 of a detected email campaign, which may cause the reporting engine 180 to access to email data store 130 and transmit one or more alert messages to administrators of a network deploying the cybersecurity system 100.

Additionally, the email campaign detection engine 140 notifies a campaign consolidation engine 190 in response to a newly detected email campaign. The campaign consolidation engine 190 may extract a malicious email representation from the newly detected email campaign and compare this email representation to pre-stored email representations associated with known email campaigns. If the malicious email representation is correlated to a selected email representation for a pre-stored email campaign, the malicious email messages for the newly detected email campaign are reassigned the campaign ID for the pre-stored email campaign. The campaign consolidation engine 190 is responsible for detecting the subset of malicious email messages that are part of a former email campaign, but were mistakenly determined as a new email campaign. The campaign consolidation engine 190 operates to aggregate correlated email campaigns into a single email campaign data structure.

Although not shown, it is noted that a second embodiment of the cybersecurity system 100 may be directed to detection of an email campaign based on analysis of other types of objects besides email messages. For example, the threat detection engine 120 may be configured to extract attachments from the email message 150, where the attachments may be automatically be stored in the email data store and analyzed in a similar manner as described for malicious email messages 150. In particular, one or more features from the attachment, such as the name of the attachment, source, and/or properties from the attachment (e.g., author, creation date, etc.) for example, may be filtered and used as a representation similar to the email representation described below. Hence, correlation between the attachments (not the email messages) is conducted in the same manner as described below to detect an email campaign. The attachment may be a document (e.g., Portable Document Format "PDF", Microsoft® WORD® document, etc.) or may be an embedded URL.

Figure 2:
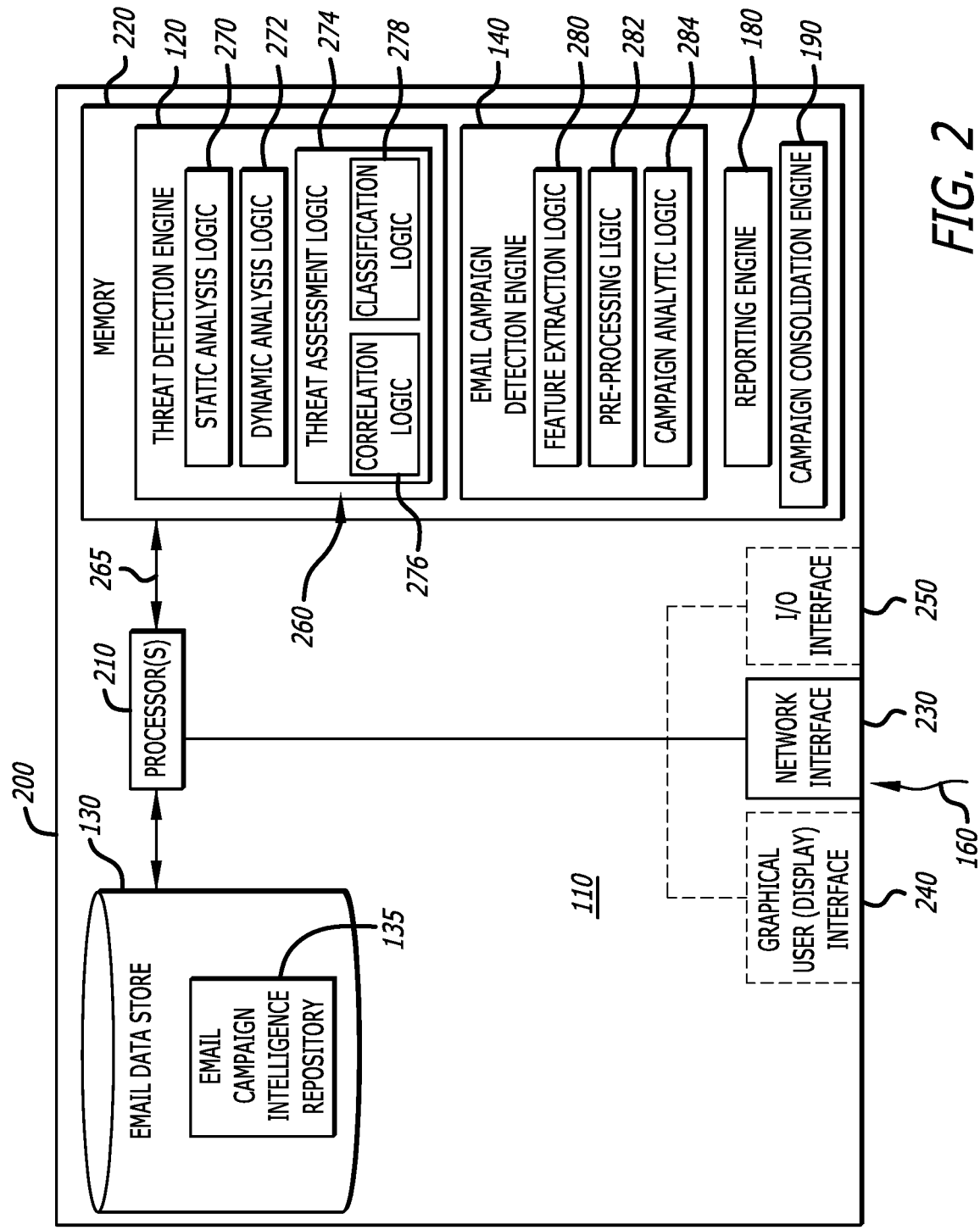
FIG. 2 is an exemplary embodiment of a network device deploying the cybersecurity system of FIG. 1.

Referring now to FIG. 2, an exemplary embodiment of the network device 110 deploying the cybersecurity system 100 of FIG. 1 is shown. Herein, the network device 110 features a plurality of components, including one or more processors (processor) 210, a memory 220, and a network interface 230. The network device 110 may further include optional interfaces for reporting of alerts, such as graphical user interface (GUI) 240 and an I/O interface 250 as represented by dashed lines. As shown, when deployed as a physical network device 110, the components are at least partially encased within a housing 200 made entirely or partially of rigid material (e.g., hardened plastic, metal, glass, composite, or any combination thereof). The housing 200 protects these components from environmental conditions. As a virtual device, however, the cybersecurity system 100 is directed to some or all of the logic within the memory 220 as described below.

The processor 210 is a multi-purpose, processing component that is configured to execute logic 260 maintained within non-transitory storage medium operating as the memory device 220. One example of processor 210 includes an Intel® (x86) central processing unit (CPU) with an instruction set architecture. Alternatively, the processor 210 may include another type of CPU, a digital signal processor (DSP), an application for specific integrated circuit (ASIC), a field-programmable gate array (FPGA), or the like.

As shown in FIG. 2, the processor 210 is communicatively coupled to the memory 220 via a transmission medium 265. According to one embodiment of the disclosure, the memory 220 is adaptive to store (i) the threat detection engine 120, (ii) the email campaign detection engine 140, (iii) the reporting engine 180, and (iv) the campaign consolidation engine 190 of FIG. 1. It is contemplated that the memory 220 may store the email data store 130 as well, although the email data store 130 is shown as a separate component. Herein the threat detection engine 120 includes static analysis logic 270, dynamic analysis logic 272 and threat assessment logic 274. Additionally, the email campaign detection engine 140 includes a feature extraction logic 280, pre-programming logic 282, and campaign analytic logic 284.

In one embodiment of the disclosure, the static analysis logic 270 may perform light-weight examination of the email message 150 to determine whether the email message 150 is suspicious and/or malicious. The static analysis logic 270 may perform any of a variety of known analyzes to the email message, such as an anti-virus scan, a spam scan, and/or employ statistical analysis techniques, including the use of heuristics, to perform non-behavioral analysis in order to detect anomalous characteristics (i.e., suspiciousness and/or malicious) without processing of the email message 150 (e.g., remove/execution of attached executable, reply/forward operation, etc.). For example, the static analysis logic 270 may employ signatures (referred to as vulnerability or exploit "indicators") to match content (e.g., bit patterns) of the content of the email message 150 with patterns of indicators of known threats in order to gather information that may be indicative of suspiciousness and/or malware. The static analysis engine 270 may apply rules and/or policies to detect anomalous characteristics, such as deviations in communication protocols for the email message 150 and/or deviations in standards for documents (e.g., Portable Document Format) attached to the email message 150, in order to identify whether email message 150 is suspect and deserving of further analysis or whether it is non-suspect (i.e., benign) without need of further analysis.

The dynamic analysis logic 272 for maliciousness detection is configured to observe behaviors of the email message 150 during run-time. In one embodiment, the dynamic analysis logic 272 may not generally wait for results from the static analysis, and thus, the analyses are performed concurrently (e.g., at least partially overlapping in time). However, in another embodiment, results of previously performed static analysis may determine whether the dynamic analysis is performed. In one embodiment, additional analysis is performed even on email messages deemed benign by the static analysis logic 270. The behaviors of the email message 150 (or executed attachment) may be observed (e.g., captured) by monitors having access to the run-time environment (e.g., virtual machine), and provided to a threat assessment logic 274, including correlation logic 276 and classification logic 278.

The static analysis results and dynamic analysis results may be provided to the correlation logic 276, which may provide correlation information to the classification logic 278. The correlation logic 276 may be configured to operate in accordance with correlation rules that define, among other things, patterns (such as, e.g., sequences) of known malicious behaviors (if-then statements with respect to, e.g., attempts by a process activities, e.g., with respect to memory accesses) that may collectively correlate to denote a malicious email message. In some embodiments, the correlation rules may define patterns of known benign behaviors that may collectively correlate to denote a benign (non-malicious) email message. The correlation rules may be updated based on the previous dynamic analysis results, as well as static analysis results. Based on the correlation rules, the correlation logic 276 generates correlation information pertaining to, e.g., a level of risk or a numerical score used to arrive at a decision of (deduce) maliciousness from the static analysis results and/or the dynamic analysis results.

The findings of the correlation logic 276 may be provided as input to the classification logic 278. The classification logic 278 is configured to use the correlation information provided by correlation logic 276 to render a decision as to whether the email message 150 is malicious. Illustratively, the classification logic 278 may be configured to classify the correlation information, including monitored behaviors (expected and unexpected/anomalous), of the email message 150 relative to those of known attacks and benign content. In some embodiments, the correlation logic 276 and the classification logic 278 may be combined into a single logic module that produces a classification as its output.

Upon determining that the email message 150 is malicious, the threat detection engine 120 stores content of the email message 150 in the email data store 130 of FIG. 1. Otherwise, the email message 150 is ignored and is not analyzed by the email campaign detection engine 140. Subsequently, the malicious email set 160 is received by the email campaign detection engine 140 for analysis. A malicious email set may be received periodically (e.g., after a threshold period of time has elapsed) or received aperiodically (e.g., after a prescribed number of malicious email messages are retained in the email data store 130 for analysis). The malicious email set may include any malicious email messages that have been stored in the email data store 130 for less than the threshold time period and are not associated with any previously determined email campaigns.

The email campaign detection engine 140 includes feature extraction logic 280, which is responsible for extracting features from each malicious email messages that is part of the malicious email set for determination as to whether any of these malicious email messages are associated with an email campaign. For each malicious email message (e.g., email message 150), these features may include (i) content within the subject line of a header of the malicious email message 150, (ii) a source of the malicious email message 150 extracted from a "From" field, and/or (iii) the name (e.g., character string) for each attachment within a body of the malicious email message 150. It is contemplated that other features may be utilized for further analysis.

Upon extracting selective features by the feature extraction logic 280, the pre-processing logic 282 is responsible for generating character patterns representative of each malicious email message by at least aggregating the characters associated with the features and conducting a filtering operation to remove (or substitute) certain characters (e.g., special characters, spaces, etc.) from the aggregate to produce a filtered character pattern. After the filtering operations, the filtered character patterns corresponding to the malicious email messages forming the malicious email set 160 are arranged in a first ordered sequence. The filtered character patterns may correspond to the email representations described herein unless the pre-processing logic 282 is configured to rearrange portions of the filtered character patterns to produce restructured, filtered character patterns operating as the email representations. The pre-processing logic 282 may be further responsible for reordering the first ordered sequence of email representations into a second ordered sequence of email representations. This reordering may be performed to group together email representations with common characteristics (e.g., character matching, temporal proximity, etc.).

After starting the filtering and ordering operations by the pre-processing logic 282, the campaign analytic logic 284 is responsible for determining, from the second ordered sequence of email representations, whether a subset of the malicious email set 160 are part of a new email campaign. Prior to or concurrently with such a determination, however, the correlation logic 282 may analyze each email representation to determine that the email representation is not associated with a known email campaign.

Figure 5:
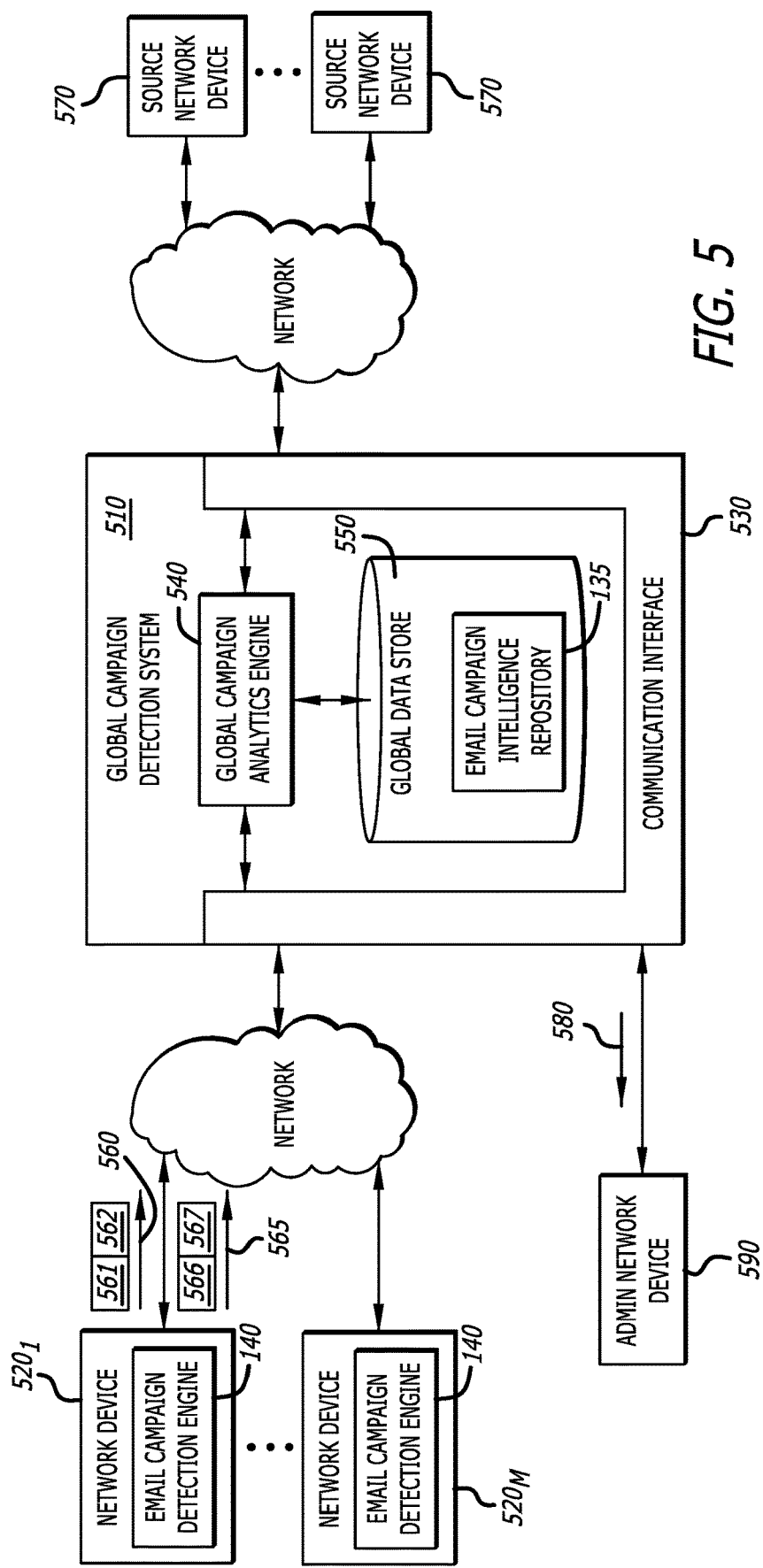
FIG. 5 is an exemplary block diagram of a network including a global campaign detection system for consolidation of campaign detections from multiple network devices.

Upon detecting which malicious email messages, if any, are associated with a known email campaign or a new email campaign, the reporting engine 180 generates one or more alert messages directed to an administrator via the GUI interface 240 and/or I/O interface 250 to provide a visual representation of the findings by the cybersecurity system 100. Additionally, or in the alternative, the alert messages may be generated and transmitted via the network interface 230 to an external resource or external network device accessible to the network administrator to analyze the findings by the email campaign detection engine 140. In some embodiments where an email campaign is identified that corresponds to a known email campaign, further information regarding the email campaign can be obtained and provided to enrich the alert or report, e g by access an email campaign intelligence repository 135 in the email data store 130 or global data store 550 (FIG. 5). Such additional information may include, for example, a previously established name for the email campaign (if any), its intent (end goal or object, such as, for example, data exfiltration, modification, destruction or look-up), origin (e.g., attacker or attack group), scope, severity, potential impact and attack chain.

IV. Email Campaign Detection Engine

Figure 3A:
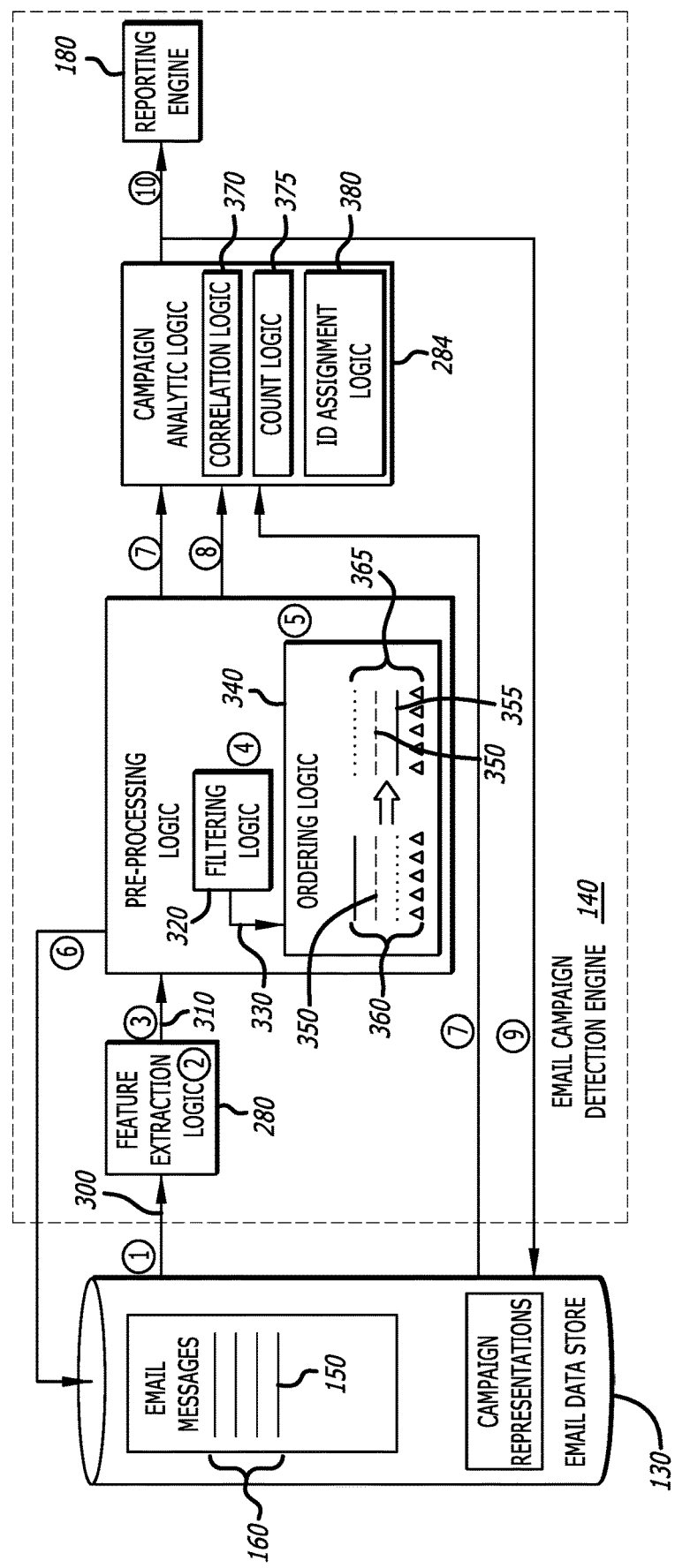
FIG. 3A is a first exemplary embodiment of a logical representation of the email campaign detection engine of FIG. 1.

Referring to FIG. 3A, a first exemplary embodiment of a logical representation of the email campaign detection engine 140 of FIGS. 1-2 and its operations for detecting an email campaign is shown. Herein, the email campaign detection engine 140 comprises the feature extraction logic 280, the pre-processing logic 282, and the campaign analytic logic 284, The email campaign detection engine 140 performs analytic operations on each malicious email message from the malicious email set 160 stored in the email data store 130. However, for clarity sake, some of the operations conducted by the email campaign detection engine 140 will be discussed in relation to the content of the malicious email message 150. These operations would apply to other malicious email messages of the malicious email set 160.

As shown, the feature extraction logic 280 receives content 300 associated with the malicious email message 150 (operation 1) and extracts a plurality of features from such content (operation 2). As described above, each feature may be represented as a character string that is extracted from a portion of the header or body of a malicious email message 150. As described above, the plurality of features may include (i) characters from a "subject line" of the malicious email message 150, (ii) characters contained within the "from" address field of the malicious email message 150, and/or (iii) characters associated with a name of each attachment and/or embedded URL link included in the body of the malicious email message 150. The character strings for each feature extracted from the malicious email message 150 are aggregated to produce a character pattern 310, which is provided to the pre-processing logic 282 (operation 3).

The pre-processing logic 282 includes filtering logic 320 to alter the character pattern 310 to produce a filtered character pattern 330. For one embodiment, the filtering logic 320 may remove characters from the character pattern 310 that are positioned to potentially obfuscate the actual subject, the source and/or the attachment (or URL) name (operation 4). For example, the filtering logic 320 may alter character pattern 310 (#¶fil§ nam«e) to the filtered character pattern 330 (filename). The pre-processing logic 282 further includes ordering logic 340, which may be configured to rearrange portions of the filtered character pattern 330 to produce a restructured character pattern (email representation) 350, which are illustrated by dashed lines and distinguished from other email representatives illustrated by other types of symbols for illustrative purposes. The email representation 350 is part of a first ordered sequence 360 of email representations including email representations associated with malicious email messages from the malicious email set other than the malicious email message 150 (hereinafter, "first ordered sequence 360"). The ordering logic 340 further reorders the first ordered sequence 360 to produce a second ordered sequence 365 (operation 5). The second ordered sequence 365 is a reordering of the first ordered sequence 360 in order to group together email representations with common characteristics. Such grouping may occur through character matching such as alphanumeric ordering, temporal proximity through chronological ordering, or the like.

As an operational feature, the email representation 350 (and other email representations) may be reported back to the email data store 130 for storage. The email representation 350 may be associated with its corresponding malicious email message and other email representations may be associated with their corresponding malicious email message (operation 6). The email representations may be retained and used for subsequent analyses while the corresponding malicious email messages are part of the malicious email set 160.

As further shown in FIG. 3A, the campaign analytic logic 284 is configured to determine whether each email representation, including the email representation 350, is associated with an email campaign. Herein, correlation logic 370 of the campaign analytic logic 284 analyzes each email representation, in an order identified by the second ordered sequence 365, to determine whether that email representation is associated with a known email campaign or part of a newly detected email campaign.

As an illustrative embodiment, the correlation logic 370 is configured to determine a level of correlation between the email representation 350 and any character patterns associated with known email campaigns received from the email data store 130 (operation 7), where the same filtering rules and techniques applied in forming the email representation 350 are applied to the known campaigns. If the level of correlation between the email representation 350 and a particular character pattern associated with a known email campaign is equal to or exceeds a first threshold, the malicious email message 150 associated with that email representation 350 is identified as part of the known email campaign. The level of correlation may be based on an edit distance (e.g., Levenshtein distance) although other metrics may be used such as Overlap coefficient, which are known to those of ordinary skill in the art.

Where the level of correlation between the email representation 350 and character patterns associated with known email campaigns fails to meet the first threshold, the correlation logic 370 analyzes the correlation between that email representation 350 and a neighboring email representation 355, namely the next email representation in the second ordered sequence 365 (operation 8). If the correlation between the email representation 350 and the neighboring email representation 355 is equal to or exceeds a second threshold (e.g., being the same or different than the first threshold), the malicious email message 150 is identified as being a potential "border" email message for an email campaign. A count logic 375, reset to a prescribed number (e.g., "0") after the start of each campaign analysis, may be incremented or decremented to produce a count value. The count value is used maintain the number of malicious email messages that are correlated to each other, where a prescribed number (N) of successive, correlated email representations is needed before the malicious email messages are identified as part of an email campaign. Hence, while the email representation 350 and the neighboring email representations 355 identify that their corresponding malicious email messages are similar (correlate), these messages are not currently considered to be an email campaign until a correlation is determined between "N" successive email representations.

Stated differently, the above-described operations by the correlation logic 370 continue for each email representation in the second ordered sequence 365. Where the email representation 350 and the neighboring email representation 355 are correlated, the above-described operations further continue for each successive email representation in the second ordered sequence 365 until the level of correlation between an email representation under analysis and its neighboring email representation falls below the second threshold. Where the number of successive, correlated email representations exceeds the prescribed number (N), as maintained by the count logic 375, the subset of malicious email messages corresponding to these successive email representations constitutes an email campaign. Furthermore, the malicious email message associated with the email representation under analysis is identified as the last email message of an email campaign.

In some embodiments, the N successive, correlated email representations must form an uninterrupted sequence, that is, a sequence of correlated email representations having no intervening non-correlating email representations. In other embodiments, the N successive correlated email representations may have a limited number of intervening non-correlating email representations. For those latter embodiments, this would facilitate detection of an email campaign even where the attacker attempts to cloak the campaign by inserting dissimilar intervening email(s) in the middle of the campaign or where two or more different email campaigns may be launched concurrently (at least partially overlapping in time) against a victim. For the latter embodiments, the correlation logic 370 continues to examine a prescribed number of neighboring email representations within the sequence after encountering a non-correlating email representation. It should be understand that selection of the common characteristics shared by email representations within the ordered sequence(s) may also permit detection of such a campaign or campaigns.

An ID assignment logic 380 within the campaign analytic logic 284 is configured to assign a campaign identifier (ID) to each malicious email message forming the newly detected email campaign. The campaign ID is used to identify the email campaign and the subset of malicious email messages within the second ordered sequence 365 that are part of the email campaign (operation 9). It is noted that the ID assignment logic 380 associates email messages with a campaign ID. Email messages assigned to a previously identified campaign may be actually part of a newly identified campaign. As such, as new campaigns are detected, the ID assignment logic 380 may be configured to re-analyze the assignment of email message that were previously analyzed to assess whether their representations indicate they should be made part of the newly identified email campaign.

Additionally, besides assignment of a campaign ID, the ID assignment logic 380 may be further configured to create and assign identifiers associated with a sub-campaign that may be used to provide additional granularity to the identified email campaign. For example, where a threat group attacks an industry, the ID assignment logic 380 may be configured to customize attacks by type (e.g., phishing attacks, spam attacks, etc.) to each target within that industry. Hence, the industry level attack would be assigned the campaign ID while the customized attacks for each target would be sub-clustered and assigned a sub-campaign ID such as phishing attacks being assigned sub-campaign ID "1", spam attacks would be assigned sub-campaign ID "2," and the like. Each of the sub-campaign IDs would be associated with a campaign ID. Alternatively, the sub-campaigns may be used to identify targeted geographic regions for attacks, sources by geography, industry where the email campaign ID is merely directed to an email campaign without industry specifics, time ranges to assist in identifying when current campaigns are occurring to encourage heightened email review during such periods, or the like.

After detection of a new email campaign (or detection of another email message associated with a known email campaign), an alert may be issued to a security administrator by the cybersecurity system 100 such as the email campaign detection engine 140 (operation 10). In some embodiments, however, the reporting engine 180 may generate an alert message for sending via a graphical user interface (GUI) for the security administrator that identifies, by labels triggered by a presence of a campaign ID, whether the email message is associated with an email campaign. Via the GUI, the security administrator may be provided with the ability to selectively adjust the content of the email campaign to add or remove email representations that were mischaracterized as part of an email campaign or not part of the email campaign.

Additionally, once an alert is generated and issued, the campaign analytic logic 284 may be further configured with remediation logic (not shown) that performs a review of previously received email messages within the email data store 130 as well as past email messages within email mailbox storage of the network device (not shown) to detect email messages correlated to email messages within the email campaign and appropriately remediate (e.g., delete or quarantine) these uncovered email messages.

Figure 3B:
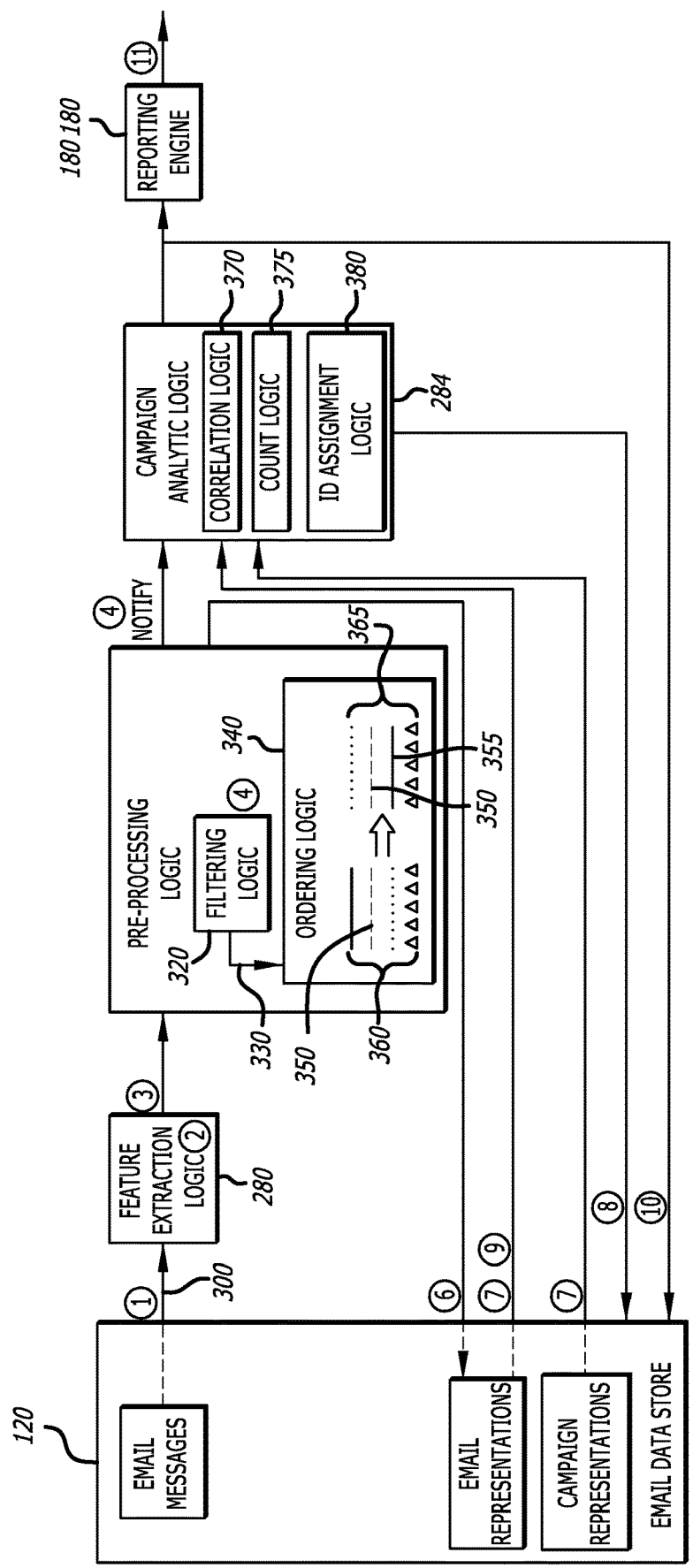
FIG. 3B is a first exemplary embodiment of a logical representation of the email campaign detection engine of FIG. 1.

Referring now to FIG. 3B, a second exemplary embodiment of a logical representation of the email campaign detection engine 140 of FIGS. 1-2 and its operations for detecting an email campaign is shown. Herein, the email campaign detection engine 140 comprises the feature extraction logic 280, the pre-processing logic 282 and the campaign analytic logic 284. As shown, the feature extraction logic 280 of the email campaign detection engine 140 receives content 300 associated with the malicious email message 150 (operation 1) and extracts the plurality of features from such content (operation 2). The character strings for each feature extracted from the malicious email message 150 may be aggregated to produce the character pattern 310, which is provided to the pre-processing logic 282 (operation 3).

The filtering logic 320 of the pre-processing logic 282 alters the character pattern 310 (e.g., pattern "#¶12&3 fil§ en am«e) to produce the filtered character pattern 330 (123filename). As described above, the filtering logic 320 may remove characters from the character pattern 310 (operation 4). These characters may be special characters, symbols, blank spaces, or whatever type of characters being used in the current threat landscape to obfuscate the actual pattern (content). Additionally, the ordering logic 340 of the pre-processing logic 282 may be configured to rearrange portions of the filtered character pattern 330 to produce the restructured character pattern operating as an "email representation" 350. The email representation 350 is part of the first ordered sequence 360, which includes the email representations associated with the malicious email messages within the malicious email set including the malicious email message 150. The ordering logic 340 further reorders the first ordered sequence 360 to produce the second ordered sequence 365 (operation 5). However, unlike FIG. 3A, the second ordered sequence 365 is reported back to the email data store 130 in order to associate the email representations to their corresponding malicious email messages. However, the order of the email representations as identified by the second ordered sequence 365 is retained to control subsequent retrieval of the email representations by the campaign analytic logic 284 (operation 6).

As further shown in FIG. 3B, the campaign analytic logic 284 is configured to determine whether each email representation, including the email representation 350, is associated with an email campaign. Herein, correlation logic 370 of the campaign analytic logic 284 retrieves each email representation, in the order identified by the second ordered sequence 365, to determine whether that email representation is associated with a known email campaign or part of a newly detected email campaign.

For example, the correlation logic 370 is configured to determine a level of correlation between the email representation 350 and any character patterns associated with known email campaigns received from the email data store 130 (operation 7). If the level of correlation between the email representation 350 and a particular character pattern associated with a known email campaign is equal to or exceeds the first threshold, the malicious email message 150 associated with that email representation 350 is identified as part of the known email campaign (operation 8).

However, where the level of correlation between the email representation 350 and character patterns associated with known email campaigns fails to meet the first threshold level, the correlation logic 370 analyzes the correlation between that email representation 350 and the neighboring email representation 355 in the second ordered sequence 365 as described above (operation 9). If the correlation between the email representation 350 and the neighboring email representation 355 is equal to or exceeds the second threshold and the above-described operations further continue for at least N−1 successive email representations in the second ordered sequence 365, these successive email representations corresponding to a subset of malicious email messages in the malicious email set 160 constitutes an email campaign. The ID assignment logic 380 within the campaign analytic logic 284 is configured to assign the campaign identifier (ID) to each malicious email message of the subset of malicious email messages (operation 10).

After detection of a new email campaign (or detection of another email message associated with a known email campaign), an alert may be issued by a reporting engine 180 to a security administrator by the cybersecurity system 100 (operation 11). In some embodiments, the reporting engine 180 may generate an alert message for sending via a graphical user interface for the security administrator that identifies, by labels triggered by an association of a campaign ID to various malicious email messages, whether the email message is associated with an email campaign.

V. Cybersecurity System Operability

Figure 4A:
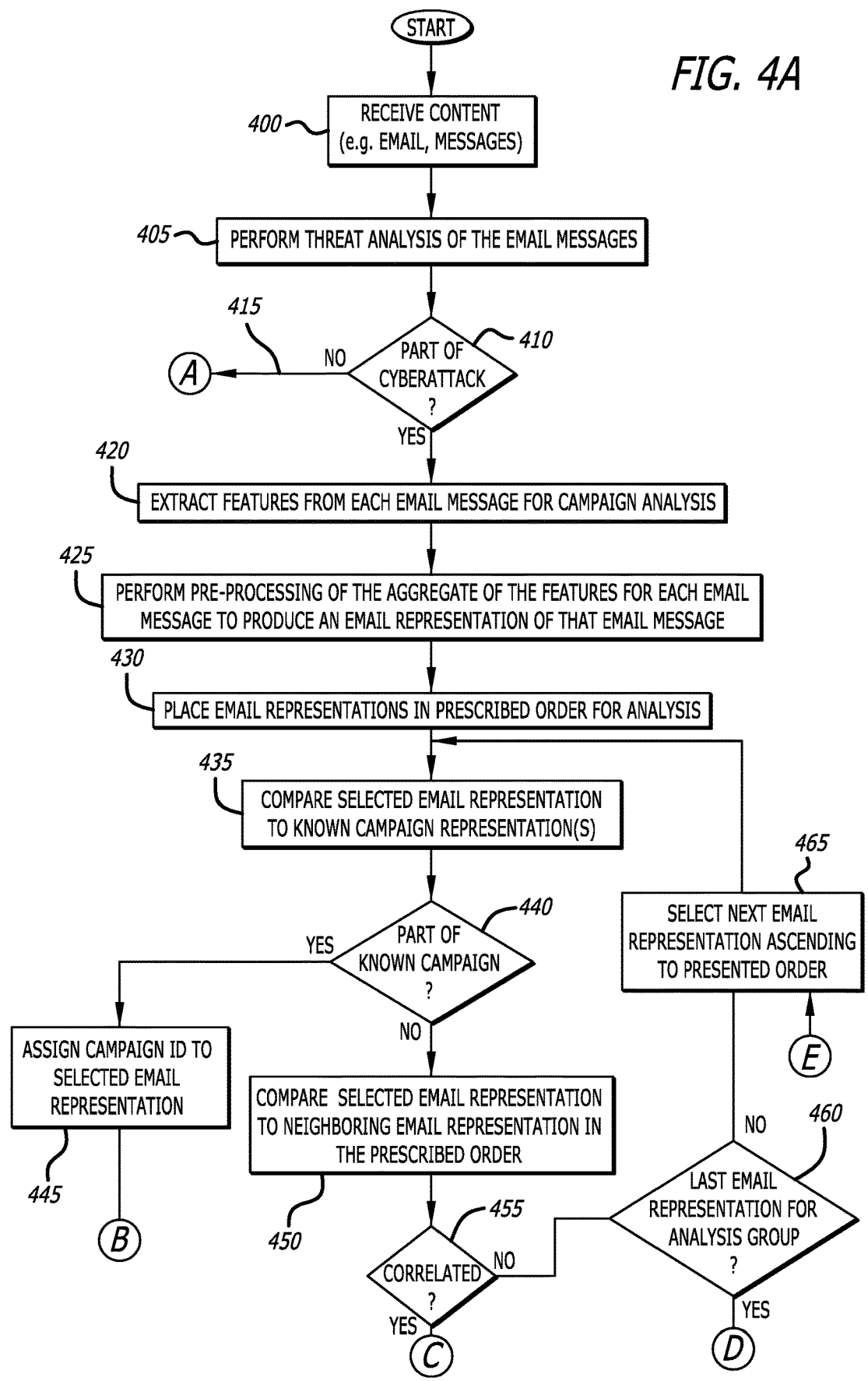
FIG. 4A-4B are an exemplary embodiment of the operations of the cybersecurity system of FIG. 1.

Referring now to FIG. 4A, an exemplary embodiment of the operations of the cybersecurity system of FIG. 1 that is configured to detect email campaigns is shown. Herein, email messages are received by the cybersecurity system (operation 400). For each email message, a threat detection system analyzes the content of the email message to determine whether the email message is malicious, namely the likelihood (e.g., probability, etc.) of the email message being associated with a cybersecurity attack exceeds a prescribed threshold (operations 405 and 410). If the email message is benign, no further operations for email campaign detection are performed on the email message (operation 415). Otherwise, the email campaign detection engine receives each of the malicious email messages for analysis.

As shown in FIG. 4A, a plurality of features is extracted from each malicious email message and pre-processing operations are performed on the plurality of features to produce an email representation for each malicious email message (operations 420 and 425). The plurality of features may include information extracted from the header and/or body of the malicious email message while the pre-processing operations are directed to the arrangement of the information for analysis. For instance, during pre-processing operations, the information may be aggregated, filtered, and portions of the filtered, aggregated information are reordered to produce the email representation. Thereafter, the email representations for a set of malicious email messages (e.g., malicious email messages not assigned to an email campaign and detected within a prescribed period of time from the current analysis are reordered into an ordered sequence of email representations for email campaign analysis (operation 430). The reordering of the email representations may be conducted in accordance with a grouping scheme that successively orders email representations with common characteristics together, where the ordering may be based on time stamp or window (e.g., email arrival time), alphabetically, transmission source ("from" field of the header), or the like. The email campaign detection analysis is conducted successively, in order, for each email representation included in the ordered arrangement of email representations.

As still shown in FIG. 4A, an email representation (e.g., first email representation) is compared to character patterns associated with known email campaigns (operation 435). In the event that the email representation is correlated to a known email campaign, the email message associated with the email representation is assigned a campaign identifier associated with the known email campaign (operations 440 and 445). Otherwise, a neighboring email representation (e.g., second email representation) is obtained and a determination is made whether the email representation is correlated to the neighboring email representation (operations 450 and 455).

Figure 4B:
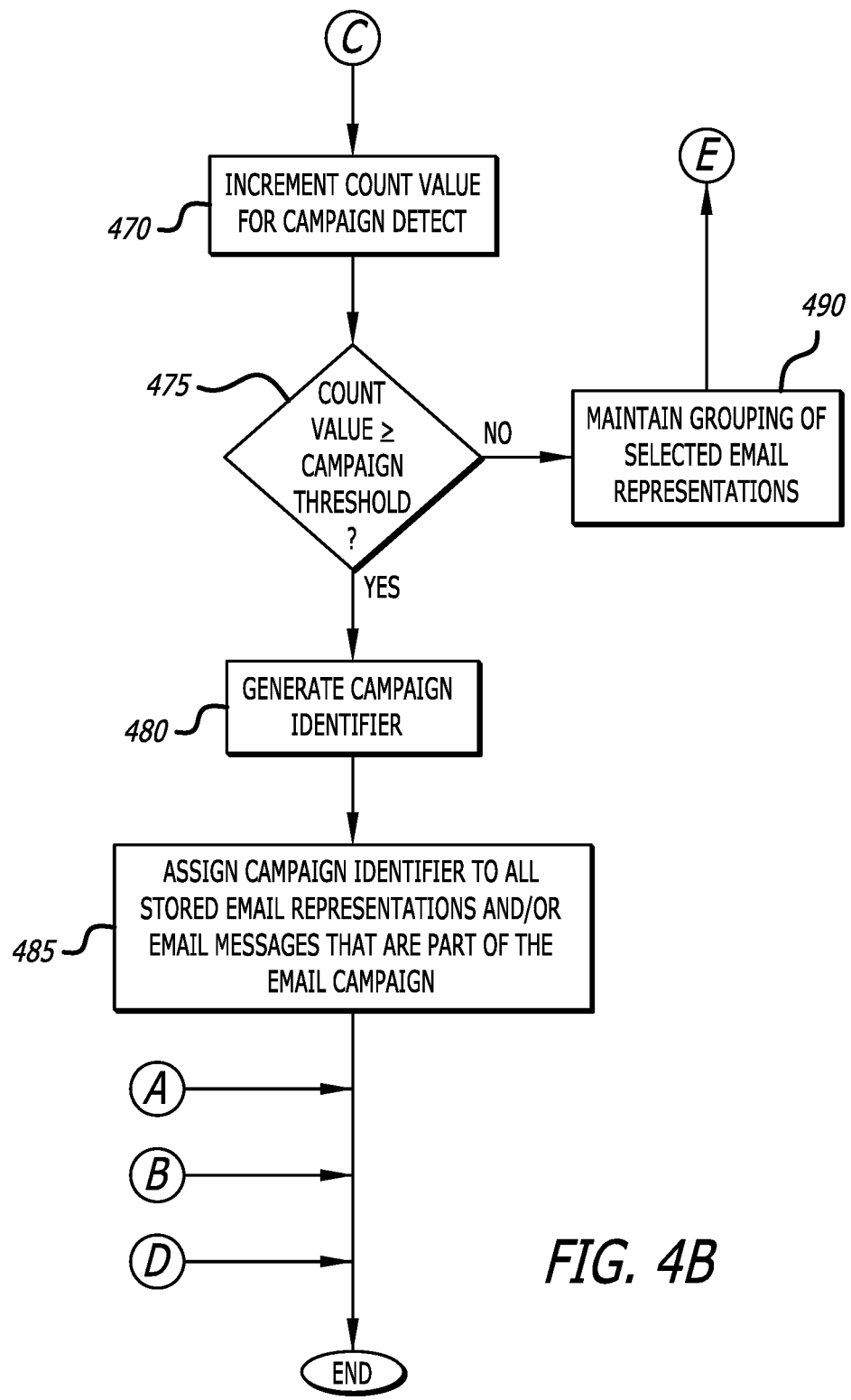

When the email representation is not correlated to the neighboring email representation, provided the email representation is not the final email representation for the ordered arrangement of email representations, the process repeats where the neighboring email representation is now the email representation under analysis (operations 460 and 465) and operations 435-440 are repeated. Otherwise, when the email representation is correlated with the neighboring email representation, the email representation may constitute a "border" (starting) email message of an email campaign attack. As a result, as shown in FIG. 4B, a count is incremented and an email campaign is detected when a prescribed number (N) of neighboring email representations are correlated (blocks 470, 475, 480 and 485).

Where the number of correlated, neighboring email representations is at least "N" email representations, an email campaign is detected. An identifier for the email campaign (campaign ID) is generated and assigned to all of the email messages associated with the correlated neighboring email representations (blocks 480 and 485). Where the number of correlated, neighboring email representations is at least "N" email representations, an email campaign has not been detected yet. Hence, the current grouping of the email representations is maintained and the process repeats where the neighboring email representation is now the email representation under analysis (operations 490 and 465).

VI. Email Campaign Consolidation and Global Analysis

Referring now to FIG. 5, an exemplary block diagram of a network 500 including a global campaign detection system 510 for consolidation of campaign detections from multiple network devices. As shown, the global campaign detection system 510 is communicatively coupled to one or more network devices $520_1$-$520_M$ (M≥1), each including an email campaign detection engine 140 described above. The global campaign detection system 510 includes a communication interface 530, a global campaign analytics engine 540, and/or a global data store 550.

Each of the network devices $520_1$-$520_M$ is configured to advise the global campaign detection system 510 of (i) a plurality of email messages that are detected to be part of a new email campaign and/or (ii) one or more email messages that are detected to be part of a known email campaign. As a result, each network devices (e.g., network device $520_1$) may be configured to issue an email campaign consolidation message 560 in response to detecting a new email campaign at a network device (e.g., network device $520_1$). Additionally, each network device may be configured to issue an email campaign update message 565 in response to detecting an email message associated with a known email campaign.

Herein, the email campaign consolidation message 560 may include information that enables the global campaign detection system 510 to (i) determine whether two or more different network devices have detected the same email campaign and (ii) retrieve additional information associated with the new email campaign from each of the network devices such as metadata associated with the new email campaign (e.g., number of email messages, originating source address, etc.) or content associated with the malicious email addresses for analysis by the global campaign detection system 510. The consolidated email campaign data may be used for more robust reporting (e.g., number of email messages sent during the email campaign, targeted destinations (e.g., networks, particular devices, geography, industry, etc.), source (e.g., device, geography, etc.).

More specifically, the email campaign consolidation message 560 may include the campaign identifier (campaign ID) 561 assigned to the newly detected email campaign along with a selected email representation 562 for that email campaign. The selected email representation 562 may correspond to a first (border) email message associated with a newly detected email campaign, although the selected email representation 562 may correspond to an email representation associated with an email message that is part of the email campaign other than a border email message. The selected email representation 562 may be used by the global campaign analytics engine 540 to determine a correlation between email campaigns detected by email campaign detection engines within different network devices (e.g., network device $520_1$ and network device $520_M$). Thereafter, upon detection of a correlation between email campaigns submitted from different network devices (e.g., network device $520_1$ and network device $520_M$), the global campaign analytics engine 540 may communicate with the network device $520_1$ and network device $520_M$ to retrieve the additional information as described above.

The email campaign update message 565 may include information that enables the global campaign detection system 510 to update a known email campaign, which is stored within the global data store 550. The message 565 may include content associated with the malicious email message 566 and the campaign ID 567 indicating the email campaign to which the malicious email address was assigned. From the content within the malicious email message, the global campaign detection system 510 may provide a more robust or thorough reporting of a detected email campaign (e.g., size of the email campaign based on the number of email messages; targeted destinations based on device, geography, and/or industry; same/different source, etc.).

The network devices $520_1$-$520_M$ may be configured to send email campaign consolidation messages 560 and/or email campaign update messages 565 periodically (e.g., each hour, each day, after a prescribed number of days, each week, etc.) or aperiodically (e.g., after detection of a new email campaign or addition to a known email campaign). As further shown, the global campaign detection system 510 may be configured to receive cybersecurity intelligence directed to email campaigns uncovered or analyzed by sources 570 other than the network devices $520_1$-$520_M$, such as incident investigation/response systems, forensic analysis systems, third-party systems, or the like.

Responsive to consolidating email campaigns detected at different network device $520_1$-$520_M$, the global campaign analytics engine 540 may generate an alert message 580 to one or more administrators (of networks to which the network device $520_1$ and network device $520_M$ belong) of the enlarged email campaign. The alert message 580 is provided to enable action to be taken, by the administrator to remediate, interdict or neutralize the email campaign attack and/or halt its spread. This remediation may involve a review of email storage of the network devices $520_1$-$520_M$ and email in-boxes at email servers or other network devices to delete or quarantine email messages Additionally, the global data store 550 may be accessed by an administrator via a network device 590, permitting and controlling external access to the global campaign detection system 510. In particular, the administrative access permits modification of rules (e.g., modify, delete, add rules) and allow an administrator to run queries to receive and organize cybersecurity intelligence from the global data store 550 for display. The cybersecurity intelligence may be used, for example, in enhanced detection, remediation, investigation and reporting.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A system for detecting an email campaign, comprising:
a processor; and
a memory communicatively coupled to the processor, the memory comprises
feature extraction logic that, when executed by the processor, extracts features from each of a plurality of malicious email messages previously determined to be malicious and received for analysis,
pre-processing logic that, when executed by the processor, generates a plurality of email representations corresponding to the plurality of malicious email messages, the plurality of email representations being arranged in an ordered sequence by at least reordering the plurality of email representations in accordance with common characteristics,
campaign analysis logic that, when executed by the processor, determines a first malicious email message of the plurality of malicious email messages is part of the email campaign (i) when a level of correlation between a first email representation of the ordered sequence of the plurality of email representations and a character pattern associated with a known email campaign is determined to exceed a first threshold, and (ii) if the level of correlation between the first email representation and the character pattern fails to exceed the first threshold, when levels of correlation between a prescribed number of successive neighboring pairs of email representations of the plurality of email representations starting with the first email representation are equal to or exceeds a second threshold, wherein the email campaign is a targeted and deliberate cyberattack based on repetitious transmission of email messages in an attempt to gain access to or disrupt operations of a targeted network device or a network to which the targeted network device is in communication, and
reporting engine that, when executed by the processor, generates one or more alert messages via a graphic user interface or an input/output interface to provide a visual representation of results produced from the campaign analysis logic.

2. The system of claim 1, wherein each feature extracted by the feature extraction logic includes a character string and the features collectively forming a character pattern.

3. The system of claim 2, wherein the pre-processing logic includes a filtering logic to remove one or more characters from each character pattern corresponding to a malicious email message of the plurality of malicious email messages to produce the plurality of email representations.

4. The system of claim 2, wherein the pre-processing logic includes (i) a filtering logic to remove one or more characters from each character pattern corresponding to a malicious email message of the plurality of malicious email messages to produce a plurality of filtered character patterns and (ii) an ordering logic to rearrange portions of each of the plurality of filtered character patterns to produce the plurality of email representations.

5. The system of claim 1, wherein the second threshold represents a lower correlation value than the first threshold.

6. The system of claim 1, wherein the campaign analysis logic that, when executed by the processor, determines the malicious email message of the plurality of malicious email messages is part of the email campaign by at least (i) determining whether a level of correlation between a first neighboring pair of email representations including the first email representation of the plurality of email representations and a second email representation of the plurality of email representations satisfies the second threshold, (ii) determining whether a level of correlation between a second neighboring pair of email representations including the second email representation and a third email representation of the plurality of email representations satisfies the second threshold, and (iii) continuing to determine whether a level of correlation between each successive neighboring pairs of email representations from the plurality of email representations exceeds the second threshold until the prescribed number email representations of the plurality of email representations are determined to be correlated.

7. The system of claim 1, wherein the prescribed number of correlated, successive neighboring pairs of email representations form an uninterrupted sequence being a sequence of correlated email representations having no intervening non-correlating email representation.

8. The system of claim 7, wherein the campaign analysis logic, when executed by the processor, arranges the plurality of email representations being in the ordered sequence based on common characteristics including chronological ordering between each of the plurality of email representations.

9. The system of claim 8, wherein the campaign analysis logic, when executed by the processor, further determines whether levels of correlation between the prescribed number of successive neighboring pairs of email representations of the plurality of email representations starting with the first email representation is equal to or exceeds the second threshold based on a particular edit distance.

10. The system of claim 1, wherein the campaign analysis logic, when executed by the processor, determines the first malicious email message is part of the email campaign in response each email representation of the prescribed number of successive email representations being determined to be correlated with a neighboring email representation of the prescribed number of email messages based on a particular edit distance.

11. The system of claim 1, wherein the memory further comprises the reporting engine that, when executed by the processor and in response to the campaign analysis logic detecting the email campaign, generates one or more alert messages directed to a graphical user interface or a network device to notify an administrator of the email campaign.

12. A computerized method for detecting an email campaign, comprising:
   extracting a plurality of features from each of a plurality of email messages, each of the plurality of features form a character pattern;
   generating a plurality of email representations corresponding to the plurality of email messages, the plurality of email representations being arranged in an ordered sequence and each of the plurality of email representations being a modified character pattern;
   determining a first email message of the plurality of email messages is part of the email campaign (i) when a level of correlation between a first email representation of the ordered sequence of the plurality of email representations and a character pattern associated with a known email campaign is determined to exceed a first threshold, and (ii) if the level of correlation fails to exceed the first threshold, when levels of correlation between a prescribed number of successive email representations of the plurality of email representations are equal to or exceeds a second threshold, wherein the email campaign is a targeted and deliberate cyberattack based on repetitious transmission of the plurality of email messages in an attempt to gain access to or disrupt operations of a targeted network device or a network to which the targeted network device is in communication; and
   generating one or more alert messages via a graphic user interface or an input/output interface to provide a visual representation of results produced in determining the email campaign.

13. The computerized method of claim 12, wherein each feature of the plurality of features extracted includes a character string.

14. The computerized method of claim 13, wherein the generating of the plurality of email representations comprises removing one or more characters from each character pattern corresponding to an email message of the plurality of email messages to produce the plurality of email representations.

15. The computerized method of claim 12, wherein generating of the plurality of email representations comprises (i) removing one or more characters from each character pattern corresponding to an email message of the plurality of email messages to produce a plurality of filtered character patterns and (ii) rearranging portions of each of the plurality of filtered character patterns to produce the plurality of email representations.

16. The computerized method of claim 12, wherein the second threshold represents a lower correlation value than the first threshold.

17. The computerized method of claim 12, wherein the determining of the first email message of the plurality of email messages being part of the newly detected email campaign by at least (i) determining whether a level of correlation between a first neighboring pair of email representations including the first email representation of the plurality of email representations and a second email representation of the plurality of email representations satisfies the second threshold, (ii) determining whether a level of correlation between a second neighboring pair of email representations including the second email representation and a third email representation of the plurality of email representations satisfies the second threshold, and (iii) continuing to determine levels of correlation between successive neighboring pairs of email representations from the plurality of email representations satisfy the second threshold until a prescribed number email representations of the plurality of email representations are determined to be correlated.

18. The computerized method of claim 12, wherein the prescribed number of successive email representations with correlation levels satisfying the second threshold form an uninterrupted sequence being a sequence of correlated email representations having no intervening non-correlating email representation.

19. The computerized method of claim 18, wherein the arranging of the plurality of email representations being in the ordered sequence of the plurality of email representations arranged chronologically.

20. The computerized method of claim 12, wherein the determining whether the levels of correlation between the prescribed number of successive email representations of the plurality of email representations is equal to or exceeds the second threshold is based on a particular edit distance.

21. A non-transitory computer readable medium including software that, when executed by one or more hardware processors, performs operations to detect an email campaign, comprising:
   extracting a plurality of features from each of a plurality of email messages, the extracted features form a character pattern for each of the plurality of email messages;
   generating a plurality of email representations by modifying each of the plurality of character patterns;
   arranging the plurality of email representations into a selected ordered sequence;
   detecting the email campaign being a targeted and deliberate cyberattack based on repetitious transmission of email messages in an attempt to gain access to or disrupt operations of a targeted network device or a network to which the targeted network device is in communications, where the repetitious transmission is determined by a level of correlation between a prescribed number of successive pairs of email representations of the plurality of email representations is equal to or exceeds a threshold; and
   generating one or more alert messages via a graphic user interface or an input/output interface to provide a visual representation of information associated with the detected email campaign.

22. The transitory computer readable medium of claim 21, wherein the prescribed number of correlated, successive pairs of email representations form an uninterrupted sequence being a sequence of correlated email representations having no intervening non-correlating email representation.

* * * * *